US011244475B2

(12) United States Patent
Zakharov et al.

(10) Patent No.: US 11,244,475 B2
(45) Date of Patent: Feb. 8, 2022

(54) DETERMINING A POSE OF AN OBJECT IN THE SURROUNDINGS OF THE OBJECT BY MEANS OF MULTI-TASK LEARNING

(71) Applicant: Siemens Aktiengesellschaft, Munich (DE)

(72) Inventors: Sergey Zakharov, Kirchseeon (DE); Shadi Albarqouni, Munich (DE); Linda Mai Bui, Olching/Grasslfing (DE); Slobodan Ilic, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/961,615

(22) PCT Filed: Dec. 18, 2018

(86) PCT No.: PCT/EP2018/085460
§ 371 (c)(1),
(2) Date: Jul. 10, 2020

(87) PCT Pub. No.: WO2019/137758
PCT Pub. Date: Jul. 18, 2019

(65) Prior Publication Data
US 2020/0357137 A1    Nov. 12, 2020

(30) Foreign Application Priority Data
Jan. 11, 2018 (EP) ...................... 18151255

(51) Int. Cl.
*G06T 7/77* (2017.01)

(52) U.S. Cl.
CPC ...... *G06T 7/77* (2017.01); *G06T 2207/20081* (2013.01)

(58) Field of Classification Search
CPC ............. G06T 2207/20081; G06T 7/77; G06T 2207/20084; G06T 7/70
See application file for complete search history.

(56) References Cited

U.S. PATENT DOCUMENTS

| 2018/0165554 | A1* | 6/2018 | Zhang | ................... G06K 9/6256 |
| 2018/0315230 | A1* | 11/2018 | Black | ...................... G06T 17/00 |
| 2020/0388065 | A1* | 12/2020 | Miller, IV | ............... G06T 13/40 |

OTHER PUBLICATIONS

Search Report for International Application No. PCT/EP2018/085460, 4 pages, dated Feb. 22, 2019.

(Continued)

*Primary Examiner* — Bobbak Safaipour
(74) *Attorney, Agent, or Firm* — Slayden Grubert Beard PLLC

(57) ABSTRACT

Various embodiments include a method for determining a pose of an object in its surroundings comprising: using an optical capture device to capture the object and its surroundings as current recording; determining the pose of the object using optical image analysis; and using a neural network to ascertain the pose of the object. The neural network is taught with multi-task learning using pose regression and descriptor learning using a triplet-wise loss function and a pair-wise loss function. The pose regression uses quaternions. Determining the triplet-wise loss function includes using a dynamic margin term. Determining the pair-wise loss function includes an anchoring function.

11 Claims, 1 Drawing Sheet

(56) References Cited

OTHER PUBLICATIONS

Zakharov Sergey et al.: "3D object instance recognition and pose estimation using triplet loss with dynamic margin", 2017 IEEE/RSJ International Conference on Intelligent Robots and Systems (IROS), pp. 552-559, XP055435885, DOI: 10.1109/IROS.2017.8202207; ISBN: 978-1-5386-2682-5, 2017.
Wohlhart Paul et al.: "Learning descriptors for object recognition and 3D pose estimation". 2015 IEEE Conference on Computer Vision and Pattern Recognition (CVPR). IEEE., pp. 3109-3118; XP032793759, DOI: 10.1109/CVPR.2015.7298930, 2015.
Bui Mai et al.: "X-Ray PoseNet: 6 DoF Pose Estimation for Mobile X-Ray Devices", 2017 IEEE Winter Conference on Applications of Computer Vision (WACV), IEEE, pp. 1036-1044, XP033096888, DOI: 10.1109/WACV.2017.120, 2017.
Balntas Vassileios et al.: "Pose Guided RGBD Feature Learning for 3D Object Pose Estimation", 2017 IEEE International Conference on Computer Vision (ICCV), IEEE, pp. 3876-3884, XP033283259, DOI: 10.1109/ICCV.2017.416, 2017.
Kehl et al.: "Deep Learning of Local RGB-D Patches for 3D Object Detection and 6D Pose Estimation", in Computer Vision—ECCV 2016, pp. 205-220, Print ISBN: 978-3-319-46486-2, Electronic ISBN: 978-3-319-46487-9, 2016.

\* cited by examiner

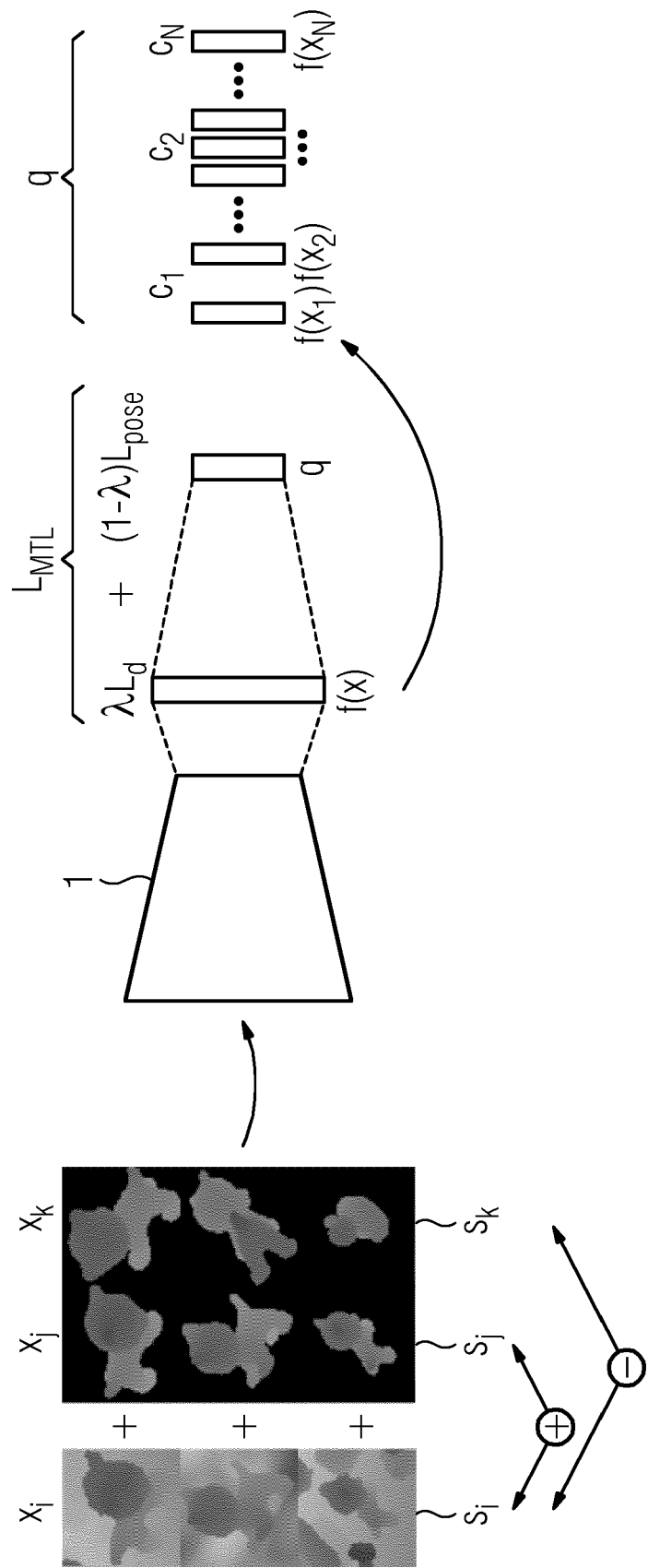

DETERMINING A POSE OF AN OBJECT IN THE SURROUNDINGS OF THE OBJECT BY MEANS OF MULTI-TASK LEARNING

CROSS-REFERENCE TO RELATED APPLICATIONS

This application is a U.S. National Stage Application of International Application No. PCT/EP2018/085460 filed Dec. 18, 2018, which designates the United States of America, and claims priority to EP Application No. 18151255.9 filed Jan. 11, 2018, the contents of which are hereby incorporated by reference in their entirety.

TECHNICAL FIELD

The present disclosure relates to optical capture. Various embodiments include methods for determining a pose of an object in its surroundings.

BACKGROUND

Determining a pose of an object is already known in the field of computer vision. By way of example, object detection and a pose estimation can be performed by means of a 2D view-specific template. By calculating manually produced property representations for a known set of views, the most similar correspondences can be found for a given template with an unknown class and pose.

The use of learning-based processes to confront this problem, instead of relying on manually produced properties, to be able to produce more descriptive and robust property representations for the query of object positions is likewise already known. By way of example, Kehl et al., "Deep Learning of Local RGB-D Patches of 3D Object Detection and 6D Pose Estimation", describes the use of an autoencoder in order to learn property descriptors for RGB-D image patches.

In their publication "Learning Descriptors for Object Recognition and 3D Pose Estimation", Wohlhart and Lepetit propose an extension of this concept of descriptor learning with a neural network. By obtaining the Euclidean loss between recordings from similar views, which are close to one another, and from different objects, which are far apart, it is possible to store both the identity of the object and the pose information in highly separable property descriptors. The pose for a given test recording can be estimated by the search for the nearest neighbor in order to find the nearest corresponding pose of the object. One of the principal disadvantages of this process is that the rotation of the plane is not considered by the method; this is only seldom the case in practice.

Modern processes for estimating the object position and for localizing the camera propose reliance on the pixel to 3D point correspondence prediction, which depends on the "forest" classification method and is based on an iterative pose refinement. Additional novel processes have introduced direct regression approaches for regressing the position and alignment of a camera for interior and exterior recordings. Although this process is able to derive the six degrees of freedom of the camera continuously using only one RGB recording as an input signal, the accuracy thereof is significantly lower than what is able to be achieved by the aforementioned processes on the basis of the pixel to 3D point correspondence prediction.

A regression approach to predict the geometric parameters of a mobile x-ray system in order to facilitate the calculation of volumes reconstructed by tomography is used in the publication "X-Ray PoseNet: 6 DoF Pose Estimation for Mobile X-Ray Devices" by Bui et al. In addition to training the model by way of the pose loss, the reconstruction loss between the x-ray projection recording of the field trial and the predicted recording using the current pose estimation is used to improve the model for its final application, tomographic reconstruction.

In the publication "Pose Guided RGBD Feature Learning for 3D Object Pose Estimation" by Balntas et al., the effects of the use of object poses as instructions for learning robust properties for the 3D object pose estimation are examined. The exact pose differences between the training patterns are examined and the target is to learn the embedding in such a way that the distances in the pose space are proportional to the distances in the property space. Should objects be symmetric, data-controlled weights are proposed, which reflect the object symmetries, like when measuring the pose distances. Moreover, the end-to-end pose regression is examined and the pose detection is carried out in a neural network and consequently used as further pose instructions for property learning.

SUMMARY

The teachings of the present disclosure include methods and control apparatuses by means of which an improved determination of a pose of an object in its surroundings can be carried out. Various embodiments include a method for determining a pose of an object in its surroundings, wherein an optical capture device is used to capture the object and its surroundings as current recording ($x_i$) and the pose of the object is determined by means of optical image analysis, and wherein, using a neural network (1), the pose of the object is ascertained as an output of the neural network (1), wherein the neural network (1) is taught by means of multi-task learning ($L_{MTL}$) by using pose regression ($L_{pose}$) and descriptor learning ($L_d$), which is determined by using a triplet-wise loss function ($L_{triplet}$) and a pair-wise loss function ($L_{pair}$) characterized in that the pose regression ($L_{pose}$) is determined by means of quaternions, the triplet-wise loss function ($L_{triplet}$) is determined on the basis of a dynamic margin term (m) and the pair-wise loss function ($L_{pair}$) is determined only as an anchoring function.

In some embodiments, an object type is detected by determining the pose of the object and/or a position of the object is determined relative to the surroundings of the object.

In some embodiments, within the scope of the pose regression $L_{pose}$ an input x into the neural network (1) is mapped to a lower-dimensioned property vector $f(x) \in R^d$.

In some embodiments, for the purposes of learning the triplet-wise loss function ($L_{triplet}$) an anchor ($s_i$) corresponding to the current recording ($x_i$) is determined and a puller ($s_j$) is chosen in such a way that the current recording ($x_i$) of the object corresponds to a recording of the object in a similar pose.

In some embodiments, for the purposes of learning the triplet-wise loss function ($L_{triplet}$) an anchor ($s_i$) corresponding to the current recording ($x_i$) is determined and a pusher ($s_k$) is chosen in such a way that the current recording of the object corresponds to a recording ($x_i$) containing another object or to a recording of the object in a different pose.

In some embodiments, the dynamic margin term (m) is determined by an arccosine function in the case of a correspondence of the current recording ($x_i$) with a recording of the object in a similar pose.

In some embodiments, the dynamic margin term (m) is determined as a linear function in the case of a correspondence of the current recording ($x_i$) with a recording containing another object or with a recording of the object in a different pose.

In some embodiments, the descriptors (q), which each describe the same object in the same pose or at least in a similar pose but in different surroundings or which originate from a different domain, are pushed together by means of the pair-wise loss function ($L_{pair}$).

In some embodiments, additionally or alternatively, a position of the object relative to the surroundings of the object is determined by means of certain property vectors f(x) by means of a nearest neighbor search.

In some embodiments, at least one symmetry property of the object is taken into account during the image analysis, in particular only a first part of the symmetric object, which is symmetric at least with respect to a second part of the symmetric object, is analyzed.

In some embodiments, the current recording ($x_i$) is captured as a depth recording.

As another example, some embodiments include a control apparatus, which is embodied to carry out a method as described herein.

BRIEF DESCRIPTION OF THE DRAWING

Here, the single FIGURE shows a schematic view of an embodiment of the method.

DETAILED DESCRIPTION

In some embodiments, an optical capture device is used to capture the object and its surroundings as current recording and the pose of the object is determined by means of optical image analysis. Using a neural network, the pose is ascertained as an output of the neural network. The neural network is taught by means of multi-task learning by a pose regression and by descriptor learning, which is determined by using a triplet-wise loss function and a pair-wise loss function. Further, the invention relates to a control apparatus.

In some embodiments, there is a method for determining a pose of an object in its surroundings. An optical capture device is used to capture the object and its surroundings as a current recording and the pose of the object is determined by means of optical image analysis. Using a neural network, the pose is ascertained as an output of the neural network. The neural network is taught by means of multi-task learning by a pose regression and by descriptor learning, which is determined by using a triplet-wise loss function and a pair-wise loss function.

In some embodiments, the pose regression may be determined by means of quaternions, the triplet-wise loss function to be determined on the basis of a dynamic margin term and the pair-wise loss function to be determined only as an anchoring function. This allows the strengths of regression and manifold learning to be combined to learn separable property descriptors, as a result of which the advantages when determining the optical property can be used. As a result, it is possible to develop robust property descriptors which, in particular, learn from the current recording. In comparison with the previous processes for solving these problems, which use the search for the nearest neighbor in an estimated descriptor space, the invention provides for the use of an efficient multi-task learning framework with direct pose regression.

$$L_{MTL} = L_{pose} + L_d,$$

where $L_{MTL}$ corresponds to multi-task learning, $L_{pose}$ corresponds to the pose regression and $L_d$ corresponds to descriptor learning. As a result, the pose can be estimated directly instead of only applying processes for the search for the nearest neighbor, the complexity of which increases linearly with the number of objects. As a result, the pose of the object can be determined in simplified fashion. Moreover, this allows a detailed analysis of the search for the nearest neighbor to be performed by means of property descriptors and regressions. As a result, a pose of the object can likewise be determined in improved fashion.

In particular, an orientation and/or a position of the object in the surroundings of the object is considered to be a pose of the object. By means of the pair-wise loss function, it is possible to take account of the exact pose difference between training recordings for various objects and poses. In some embodiments, the pose is directly improved in the pose space, i.e., the angle error of the quaternion representation can be minimized.

In some embodiments, the pose regression has a positive effect on the descriptor learning and the descriptor learning is of assistance with the pose regression. In particular, this has advantageous effects on the end-to-end learning. Particularly in the case of large object databases, this leads to improved processing and to improved determination of the pose of the object.

In some embodiments, an object type is detected by determining the pose of the object and/or a position of the object is determined relative to the surroundings of the object. As a result, it is possible, in particular, that the current recording can both support the performance of an object detection and, as an alternative or addition thereto, allow a position of the object to be determined in the surroundings of the object. As a result, the method is flexibly usable and can be used in many technical fields.

In some embodiments, within the scope of the pose regression, an input x into the neural network is mapped to a lower-dimensioned property vector $f(x) \in R^d$. This means that the output of the last completely connected layer before it is used for the regression of the pose with the subsequent loss function has the following function:

$$L_{pose} = \left\| q - \frac{\tilde{q}}{\|\tilde{q}\|} \right\|_2^2$$

where q is the corresponding field trial pose.

In some embodiments, for the purposes of learning the triplet-wise loss function, an anchor corresponding to the current recording is determined and a puller is chosen in such a way that the current recording of the object corresponds to a recording of the object in a similar pose. For the comparison with the baseline process, the training set $S_{train}$ can be used to generate a database with recording property descriptors for the search for the nearest neighbor, which database is then used to obtain the best corresponding pose for an unknown test recording. In order to achieve an efficient regression, the robust recording property descriptors f(x) must be created. The triplet-wise loss function $L_{triplets}$, which represents a loss function, is used to train the neural network. It is trained by a number of triplets $(s_i, s_j, s_k)$ E T, where a sample $s_i$ (anchor) corresponds to the current recording $x_i$ and a sample $s_j$ (puller) is chosen in such a way that the recording corresponds to the same object $c_j$, which is considered from a similar pose $q_j$:

$$\|f(x_i)-f(x_k)\|_2^2$$

In some embodiments, for the purposes of learning the triplet-wise loss function, an anchor corresponding to the current recording is determined and a pusher is chosen in such a way that the current recording of the object corresponds to a recording containing another object or to a recording of the object in a different pose. A sample $s_k$ (pusher) is chosen in such a way that the recording $x_k$ corresponds either to another object $c_k$ or to the same object $c_i$, albeit considered under a completely different pose $q_k x \in \mathbb{R}^{n \times n}$:

$$\|f(x_i)-f(x_j)\|_2^2$$

In some embodiments, the loss defined by way of a group of triplets is formulated as follows:

$$L_{triplets} = \sum_{(s_i,s_j,s_k) \in T} \max\left(0, 1 - \frac{\|f(x_i)-f(x_k)\|_2^2}{\|f(x_i)-f(x_j)\|_2^2 + m}\right)$$

In some embodiments, the dynamic margin term is determined by an arccosine function in the case of a correspondence of the current recording with a recording of the object in a similar pose. The dynamic margin term m is defined as follows:

$$m = \begin{cases} 2 \arccos(|q_i \cdot q_j|) & \text{if } c_i = c_j \\ n & \text{else, for } n > \pi, \end{cases}$$

The dynamic margin term m ensures that objects of different classes are pushed further away, with the margin term m for the same objects depending on the angular spacing between the current viewing angles $q_i$ and $q_j$.

In some embodiments, the dynamic margin term can be determined as a linear function in the case of a correspondence of the current recording with a recording containing another object or with a recording of the object in a different pose. The dynamic margin term m is defined as follows:

$$m = \begin{cases} 2 \arccos(|q_i \cdot q_j|) & \text{if } c_i = c_j \\ n & \text{else, for } n > \pi, \end{cases}$$

The dynamic margin term m ensures that objects of different classes are pushed further away, with the margin term m for the same objects depending on the angular spacing between the current viewing angles $q_i$ and $q_j$.

In some embodiments, the descriptors, which each describe the same object in the same pose or at least in a similar pose but in different surroundings and which originate from a different domain, are pushed together by means of the pair-wise loss function. The pair-wise loss function $L_{pairs}$ is calculated from the pairs $(s_i, s_j) \in P$ and is defined as:

$$L_{pairs} = \Sigma_{(s_i,s_j) \in P} \|f(x_i)-f(x_j)\|_2^2,$$

where $f(x_i)$ is the recording property descriptor q, which was extracted from the neural network for the current recording $x_i$.

In some embodiments, a position of the object relative to the surroundings of the object is determined by means of certain property vectors f(x) by means of a nearest neighbor search. As a result, the resultant property descriptors can be separated according to their pose and their relationship can be used to add a direct regression approach.

In some embodiments, at least one symmetry property of the object is taken into account during the image analysis, in particular only a first part of the symmetric object, which is symmetric at least with respect to a second part of the symmetric object, is analyzed. In particular, the number of altered poses is restricted by virtue of only keeping the unique poses. Less memory is required (as a result of extra rendered poses). This can save computational power and computing time when determining the property of the object.

In some embodiments, the current recording is captured as a depth recording. In the case of the depth recording, the image analysis facilitates the use of depth information in a 2D recording in order to obtain information in respect of the depth layers for the image analysis. The depth recordings are not RGB recordings. As a result, it is possible to save computing time, in particular, in relation to the prior art since only the depth recordings are used for determining the pose of the object.

In some embodiments, there is a control apparatus, which is embodied to carry out a method as described herein. The control apparatus is, in some embodiments, an electronic computing device. Various embodiments of the method should be considered to be embodiments of the control apparatus as well. To this end, the control apparatus has physical features which facilitate the method, or an embodiment thereof, being carried out.

Further features and advantages can be gathered from the following description on the basis of the attached FIGURE. In the FIGURE, the same reference signs denote the same features and functions. The exemplary embodiments only serve to explain the invention and are not intended to restrict the latter. Here, the only FIGURE shows a schematic view of an embodiment of the method. In the FIGURE, the same and functionally equivalent elements are provided with the same reference signs.

The FIGURE shows an example embodiment of the method in a schematic view. Using an input depth recording patch, corresponding triplets and pairs are generated during the training in order to perform both manifold embedding and the creation of robust property descriptors and pose regression $L_{pose}$. The exemplary embodiment shown in the FIGURE starts with the training of a neural network 1 for a given training set $S_{train}$ $\{s_1, \ldots, s_N\} = \{(x_1, c_1, q_1), \ldots, (x_N, c_N, q_N)\}$ consisting of N samples S. Each sample s consists of a depth recording part $x \in \mathbb{R}^{n \times n}$ of an object $c \in N$, together with the corresponding pose vector $q \in \mathbb{R}^4$ which provides the orientation, which is represented by quaternions.

In some embodiments, there is modeling of the mapping function $\phi: X \to Q$; i.e., for a given input x, the predicted pose vector $\tilde{q}$ is obtained as follows:

$$\tilde{q} = \phi(x, w),$$

where w are the model parameters. In some embodiments, an accurate pose estimation may be obtained for all invisible data. Additionally, there may be a well clustered property space. Multi-task learning $L_{MTL}$ is carried out in order to achieve this. The multi-task learning $L_{MTL}$ is carried out by means of pose regression $L_{pose}$ and descriptor learning $L_d$. Thus, the overarching target function can be described as follows:

$$L_{MTL} = L_{pose} + L_d,$$

where $L_{pose}$ and $L_d$ are the target functions for the pose regression task and the descriptor learning task, respectively.

During the test, the neural network 1 maps a given input x to a lower-dimension feature vector $f(x) \in R^d$, i.e., the output of the last completely connected layer before it is used for the regression of the pose, with the following loss function being used:

$$L_{pose} = \left\| q - \frac{\tilde{q}}{\|\tilde{q}\|} \right\|_2^2$$

where q is the corresponding field trial pose.

For the comparison with the baseline process, the training set $S_{train}$ can be used to generate a database with recording property descriptors q for the search for the nearest neighbor, which database is then used to obtain the best corresponding pose for an unknown test recording. The robust recording property descriptors q have to be created in order to achieve an efficient regression. Use is made of the triplet-wise loss function $L_{triplets}$, which represents a loss function, in order to train the neural network 1. The latter is trained by a number of triplets $(s_i, s_j, s_k) \in T$, where a sample $s_i$ (anchor) corresponds to the current recording $x_i$ and a sample $s_j$ (puller) is chosen in such a way that the recording corresponds to the same object $c_j$, which is considered from a similar pose $q_j$. However, a sample $s_k$ (pusher) is chosen in such a way that the recording $x_k$ corresponds either to another object $c_k$ or to the same object $c_i$, albeit considered under a very different pose $q_x x \in \mathbb{R}^{n \times n}$. The loss, which is defined by way of a group of triplets, is formulated as follows:

$$L_{triplets} = \sum_{(s_i, s_j, s_k) \in T} \max\left( 0, 1 - \frac{\|f(x_i) - f(x_k)\|_2^2}{\|f(x_i) - f(x_k)\|_2^2 + m} \right)$$

wherein viewing angles in a similar pose are pulled close together and unequal or different objects are pushed further away. A dynamic margin term m is defined as follows:

$$m = \begin{cases} 2 \arccos(|q_i \cdot q_j|) & \text{if } c_i = c_j \\ n & \text{else, for } n > \pi, \end{cases}$$

The dynamic margin term m ensures that objects of different classes are pushed further away, with the margin term m for the same objects depending on the angular spacing between the current viewing angles $q_i$ and $q_j$.

Moreover, a pair-wise loss function $L_{pairs}$ is used to pull together the recording property descriptors q of the same object with the same or very similar pose albeit with different backgrounds or from different domains (synthetic and real). The pair-wise loss function $L_{pairs}$ is calculated for the pairs $(s_i, s_j) \in P$ and is defined as:

$$L_{pairs} = \sum_{(s_i, s_j) \in P} \|f(x_i) - (x_j)\|_2^2,$$

where $f(x_i)$ is the recording property descriptor q, which was extracted from the neural network 1 for the current recording $x_i$.

However, instead of only relying on the calculated features for the search for the nearest neighbor, provision is made for additional use to be made of the fact that the resultant recording property descriptors q are separated according to their pose and use their relationship to add a direct regression approach. Overall, the following loss function $L_d$ is obtained for the descriptor learning:

$$L_d = L_{triplets} + L_{pairs}$$

The descriptor learning $L_d$ is stored in a descriptor memory 2. Consequently, an end-to-end multi-task learning framework for object detection and pose estimation is presented. By the introduction of a regression framework with robust recording property descriptor learning, it is possible to completely eliminate the necessity for the nearest neighbor search in comparison with the baseline processes, which in turn leads to an improvement of the memory consumption and the efficiency of the processes. This yields advantages by virtue of promoting the pose regression $L_{pose}$ and the descriptor learning $L_d$ and improving the resultant accuracy for the query of the nearest neighbor position.

What is claimed is:

1. A method for determining a pose of an object in its surroundings, the method comprising:
   using an optical capture device to capture the object and its surroundings as current recording;
   determining the pose of the object using optical image analysis; and
   using a neural network to ascertain the pose of the object;
   wherein the neural network is taught with multi-task learning using pose regression and descriptor learning using a triplet-wise loss function and a pair-wise loss function;
   wherein the pose regression uses quaternions;
   wherein determining the triplet-wise loss function includes using a dynamic margin term; and
   wherein determining the pair-wise loss function includes an anchoring function.

2. The method as claimed in claim 1, further comprising detecting an object type by determining the pose of the object and/or a position of the object relative to the surroundings of the object.

3. The method as claimed in claim 1, further comprising mapping an input x into the neural network within the scope of the pose regression to a lower-dimensioned property vector $f(x) \in R^d$.

4. The method as claimed in claim 1, further comprising:
   determining an anchor corresponding to the current recording for learning the triplet-wise loss function; and
   choosing a puller so the current recording of the object corresponds to a recording of the object in a similar pose.

5. The method as claimed in claim 1, further comprising:
   determining an anchor corresponding to the current recording for the purposes of learning the triplet-wise loss function; and
   choosing a pusher so the current recording of the object corresponds to a recording containing another object or to a recording of the object in a different pose.

6. The method as claimed in claim 4, further comprising determining the dynamic margin term using an arccosine function in the case of a correspondence of the current recording with a recording of the object in a similar pose.

7. The method as claimed in claim 5, further comprising determining the dynamic margin term as a linear function in the case of a correspondence of the current recording with a recording containing another object or with a recording of the object in a different pose.

8. The method as claimed in claim 1, further comprising pushing together the descriptors which each describe the same object in the same pose or at least in a similar pose but in different surroundings or which originate from a different domain, using the pair-wise loss function.

9. The method as claimed in claim 1, further comprising determining a position of the object relative to the surroundings of the object using property vectors $f(x)$ by means of a nearest neighbor search.

10. The method as claimed in claim 1, further comprising accounting for at least one symmetry property of the object during the image analysis.

11. The method as claimed in claim 1, further comprising capturing the current recording as a depth recording.

* * * * *